United States Patent [19]

Pickard

[11] Patent Number: 4,999,730
[45] Date of Patent: Mar. 12, 1991

[54] LINE VOLTAGE MONITOR AND CONTROLLER

[76] Inventor: Harold W. Pickard, 10 Collins Rd., Ulm, Mont. 59485

[21] Appl. No.: 350,614

[22] Filed: May 10, 1989

[51] Int. Cl.$^5$ .............................................. H02H 3/24
[52] U.S. Cl. ........................................ 361/59; 361/75; 361/86; 361/90; 340/662
[58] Field of Search ........................ 361/33, 29, 28, 23, 361/59, 74, 75, 86, 87, 89, 90, 92; 340/662

[56] References Cited

U.S. PATENT DOCUMENTS

| | | | |
|---|---|---|---|
| 3,936,701 | 2/1976 | Wilson et al. | 361/92 |
| 4,156,838 | 5/1979 | Montague | |
| 4,437,134 | 3/1984 | Dupraz | 361/56 |
| 4,571,656 | 2/1986 | Ruckman | 361/56 |
| 4,584,623 | 4/1986 | Bello et al. | 361/90 |
| 4,689,713 | 8/1987 | Hourtane et al. | 361/118 |
| 4,695,916 | 9/1987 | Satoh et al. | 361/56 |
| 4,779,027 | 10/1988 | Sikora | |
| 4,860,153 | 8/1989 | Ishii | 361/92 |

OTHER PUBLICATIONS

Innovative Technology, Inc., Products Catalog, Sep. 1988, 15 pp.
Global Computer Supplies, Product Catalog, Oct. 1988, 7 pp.
Dynatech Computer Power, Inc., Product Literature, Oct. 1987, 9 pp.
American Power Conversion Corp., Uninterruptable Power Supply Data, 1987.

*Primary Examiner*—Todd E. Deboer
*Attorney, Agent, or Firm*—Marger Johnson McCollom & Stolowitz, Inc.

[57] ABSTRACT

A line voltage monitor and controller disconnects AC-powered user equipment from an AC power line whenever the AC power line voltage is outside a predetermined operating voltage window. The equipment is automatically reconnected to the power line only after the power line voltage remains continuously within the operating voltage window for a predetermined delay period. The controller protects the user equipment from both over-voltage and under-voltage (brownout) conditions.

14 Claims, 4 Drawing Sheets 4,999,730

LINE VOLTAGE MONITOR AND CONTROLLER

BACKGROUND OF THE INVENTION

This invention relates to the field of protecting electrical circuits against potentially damaging effects of electrical transients and, more particularly, to methods and apparatus for protecting AC-powered user equipment from both overvoltage and undervoltage conditions.

Many types of electrical equipment are susceptible to malfunctions or damage due to transient impulses or voltage conditions which exceed an acceptable voltage range or window. For example, computers and TV satellite receiver decoders are very sensitive to voltage transients. AC powered motors are subject to damage from overheating when driven by AC voltages greater than or less than an intended AC voltage operating range.

Since voltage transients may be caused by such things as lightning strikes, inductive load switching and physical shock to power lines, utility companies which supply electrical power have no practical ways of preventing such occurrences. The problems are particularly acute in rural areas.

Various crowbar circuits are known for shunting an AC power line to ground in the event of an overvoltage condition. Crowbar circuits may employ, for example, gas discharge tubes or SCR's connected across the power line. A crowbar circuit, when fired, presents an essentially short circuit across the power line, thereby causing a fuse to blow or a circuit breaker to trip upstream of the crowbar circuit to disconnect the AC line from the user equipment. A user must locate, identify and replace or reset the fuse or circuit breaker, respectively, in order to restore AC power to the user equipment. These actions are inconvenient and extend the equipment downtime.

Various solid state transient protection components also are known, including zener diodes or silicon avalanche diodes, varistors including the metal oxide varistor, and the like. Typically, such components are connected across the AC power line to shunt transient signals that exceed a predetermined "clamping" voltage. They may be used in combination, as taught in U.S. Pat. Nos. 4,571,656 and 4,156,838. When shunt components are used across the AC power line, the user equipment remains connected to the AC power line at all times. The user equipment is left exposed to potential damage to the extent that a transient spike or surge is not absorbed by the shunt devices.

Many shunt-type protective circuits have clamping voltages that are not well defined or are too high. For example, where successive shunt stages are used, as shown in U.S. Pat. No. 4,571,656, the impedance to ground decreases gradually as a powerline spike increases in voltage and power, due to the respective turn-on characteristics of each of the shunting devices. The final shunt stage may not fully turn on until the powerline voltage exceeds 200 VAC or more. Most AC-powered user equipment in the U.S. is designed to operate at a nominal line voltage of 120 VAC +/− 10% (i.e. 108–132 volts). Shunt circuits therefore do not adequately protect such user equipment from overvoltage conditions.

Shunt devices also subject user equipment to erratic on-again, off-again operation where the AC power line voltage is irregular. This intermittant operation itself can lead to potentially damaging transients, particularly if the user equipment load is inductive. For example, intermittent operation of electric motor starter windings causes them to burn out.

Another drawback of shunt device circuit protection is that a powerful powerline transient may destroy a solid state shunt device, effectively removing it from the circuit. The user equipment is left completely unprotected against any subsequent transients.

Finally, shunt devices offer no protection against undervoltage conditions, i.e., where the AC line voltage falls below a predetermined minimum voltage, for example, 90 volts. This is frequently referred to as a "brown-out" condition. Motors connected to refrigerant compressors and similar loads can burn out under brownout conditions. Computer disk drive damage can also be caused by brownouts.

U.S. Pat. No. 4,689,713 discloses a high voltage surge protection circuit that includes a peak limiting bridge. In operation, an overvoltage transient is shunted to ground through a power diode and capacitor, connected in series. The peak limiting bridge suffers the same shortcomings as the other shunt devices described above.

Accordingly, a need remains for an improved AC voltage monitor and controller, particularly for general purpose protection of AC-powered equipment.

SUMMARY OF THE INVENTION

One object of the present invention to protect AC-powered user equipment from both overvoltage and undervoltage conditions on the AC powerline connected to the user equipment.

Another object of the invention is protect user equipment from intermittent operation otherwise resulting from irregularities in the AC power line voltage.

A further object of the invention is to disconnect user equipment from the AC powerline whenever the line voltage is outside a well-defined operating voltage window.

Yet another object is to automatically reconnect the user equipment to the AC powerline only after the line voltage is steadily re-established within the operating voltage window.

According to the present invention, an automatic control circuit is provided for controlling a power signal connection between an AC power line and AC-powered user equipment. The circuit includes a controllable power line switch, for example, a solid-state relay, for switching the power signal connection between the power line and the user equipment. The circuit is connected to the power line for coupling the AC power to the circuit. AC voltage monitoring circuitry is coupled to the power line for providing a DC monitoring signal. The DC monitoring signal is so designated to indicate that its polarity with respect to ground is constant. However, its magnitude (voltage) varies responsive to the AC powerline voltage. The monitoring circuitry is arranged to avoid unduly filtering high frequency components of the powerline voltage so that the monitoring signal is responsive to components of the powerline voltage having frequencies greater than the nominal line frequency.

Window comparator circuitry detects and indicates a fault condition whenever the DC monitoring signal voltage falls outside a predetermined DC reference voltage window that corresponds to a predetermined AC operating voltage window. A turn-off circuit actuates the power line switch responsive to the indication of a fault condition to disconnect the user equipment from the AC power line. A restore circuit actuates the power line switch at the end of a predetermined delay period to reconnect the user equipment to the AC power line. The restore circuit is coupled t the monitoring circuit so that the delay period starts when the power line switch is deactuated or OFF and a fault condition is not indicated.

A second indication of a fault condition during the delay period restarts the delay period so that the user equipment is not reconnected to the AC power line. Reconnection is made only after the power line voltage has remained within the AC operating voltage window continuously for the delay period. This process serves to protect the user equipment from brief, repeated excursions of the power line voltage outside the AC operating voltage window and thereby protect it from damage due to intermittent operation.

A secondary power circuit provides a predetermined DC voltage signal. Resistive dividers can be used to divide the DC voltage signal to provide first and second reference voltage signals defining the DC reference voltage window.

The AC voltage monitoring circuitry preferably includes a transformer for stepping down the power line voltage, a bridge rectifier circuit, and a filter circuit. The transformer, bridge and filter circuits are arranged so that the monitoring signal has a predetermined nominal DC voltage corresponding to the nominal AC power line voltage and so that variations in the power line voltage are reflected in corresponding variations in the DC monitoring signal voltage.

The restore circuit includes a timer for providing the delay period. The timer can be a delay capacitor and a pull-up resistor connected between the delay capacitor and the secondary DC voltage source for charging the capacitor. The delay capacitor remains discharged during normal steady-state operation, and begins charging when the timer is actuated to begin the delay period. A comparator is coupled to the delay capacitor and to a DC reference voltage source for indicating the conclusion of the delay period when the delay capacitor voltage equals or exceeds the DC reference voltage.

A reset input to the timer is provided for resetting the timer to restart the delay period and for holding the timer in a reset state. The reset input includes a transistor switch connected between the delay capacitor and a ground junction. The transistor has a base input coupled to the window comparator means to receive the indication of a fault condition. The transistor discharges the delay capacitor responsive to the indication of a fault condition and holds the delay capacitor discharged so long as the fault condition is indicated.

The timer circuitry also includes a diode having an anode connected to the delay capacitor and a cathode connected to the DC voltage source (back bias) and to a second resistor for discharging the delay capacitor through the second resistor when there is a power failure during a restart. This feature ensures that the delay capacitor is in a discharged state upon initial power-up of the circuit or after a prolonged power outage.

The power line switch relay is DC controlled. It is controlled by a second controllable switch, preferably an SCR, connected between the relay control input terminal and the secondary DC power signal circuit. A turn-off transistor is connected between the SCR gate input and ground so that when the turn-off transistor is ON, the SCR is OFF, and therefore the relay is OFF. The base input to the turn-off transistor receives the indication of a fault condition provided by the window comparator circuitry.

A voltage comparator has an inverting input terminal coupled to a DC delay reference signal and a noninverting input terminal coupled to the delay capacitor. The output of the comparator is coupled to the SCR gate. The output goes high, thereby turning the SCR ON, when the delay capacitor voltage equals the delay reference signal voltage, signifying the conclusion of the delay period. The delay period is preferably about 20 seconds.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Functional Overview

Figure 1:
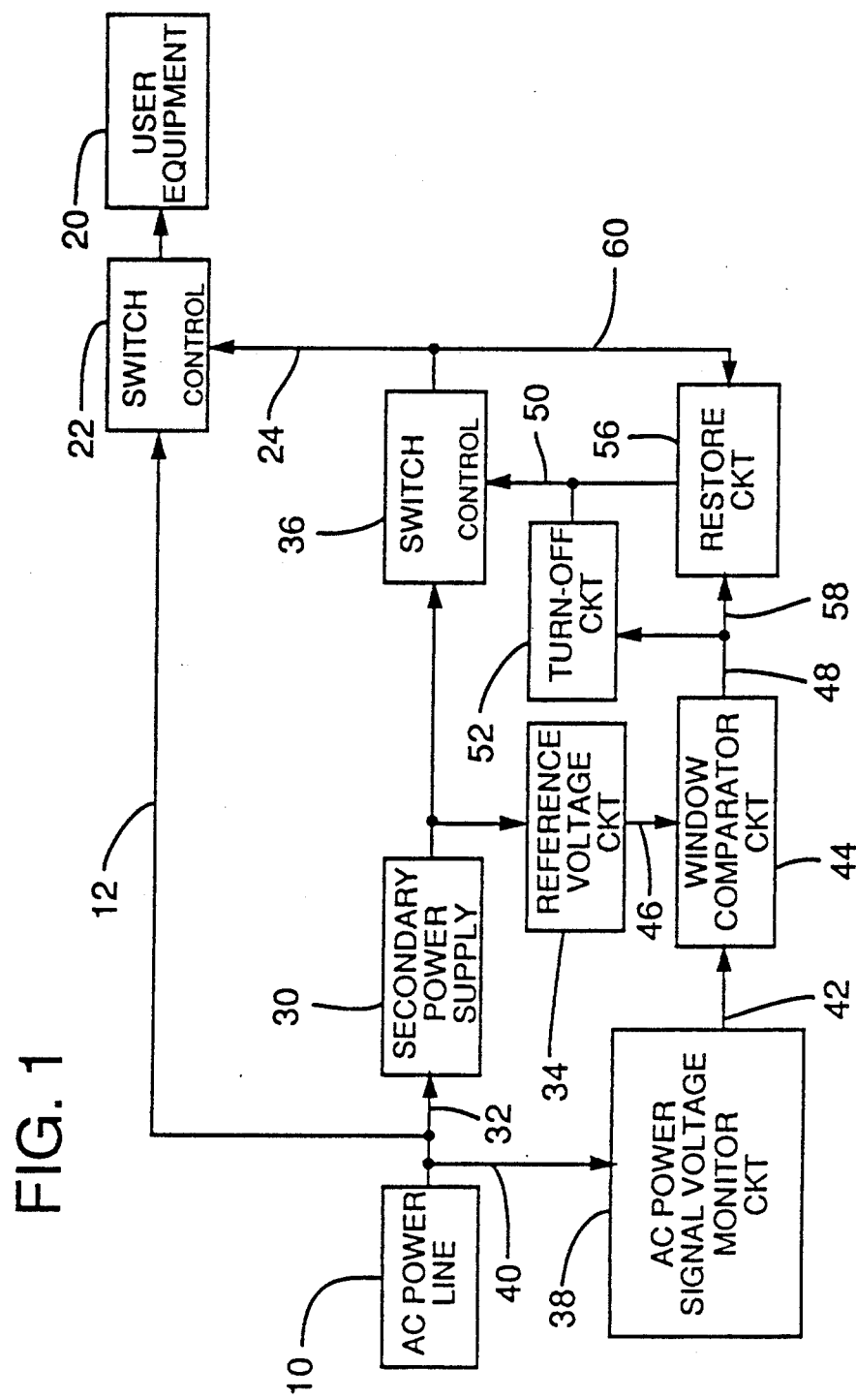
FIG. 1 is a functional block diagram of a control circuit according to the present invention, the control circuit disposed between an AC power line and AC-powered user equipment.

FIG. 1 is a functional block diagram of a control circuit for controlling a power signal connection between an AC power line 10 and AC powered user equipment 20. The AC power line 10 provides AC power which is connected via path 12 to the use equipment 20 through a controllable power line switch 22. The power line switch 22 disconnects the AC power line from the user equipment 20 whenever the AC power line voltage is outside a predetermined AC operating voltage range. Preferably, a predetermined upper voltage limit and a predetermined lower voltage limit together define an acceptable AC operating voltage window.

A secondary power supply 30 receives AC power from the AC power line 10 along path 32. The secondary power supply 30 provides suitable DC power for various parts of the control circuitry, including a reference voltage circuit 34 and a second controllable switch 36, further described below.

An AC line voltage monitoring circuit 38 is connected to the AC power line 10 via path 40 for coupling the power line to the control circuitry. The AC line voltage monitoring circuit 38 provides a monitoring signal along path 42 to a window comparator circuit 44. The reference voltage circuit 34 provides reference voltages along path 46 to the window comparator circuit 44.

The AC line voltage monitoring circuit 38 and the window comparator circuit 44 are arranged to detect and indicate a fault condition whenever the AC power line voltage is outside the AC operating voltage window. Indication of a fault condition is provided along path 48 to additional circuitry arranged to disconnect the user equipment 20 from the AC power line 10 and for other purposes, as described next.

The controllable power line switch 22 is controlled by a second controllable switch 36. The second controllable switch 36 is controlled by a control signal provided along path 50. Turn-off circuitry 52 is connected to the path 50 to control the second switch 36 and is connected to receive the indication of a fault condition via path 48. Responsive to the indication of a fault condition along path 48, the turn-off circuit 52 controls the switch 36 so that it, in turn, controls the power line switch 22 so as to disconnect user equipment 20 from the AC power line.

Restore circuit 56 is arranged to actuate the second switch 36. This, in turn, actuates the power line switch 22 to reconnect the user equipment 20 to the AC power line 10, but only upon the completion of a predetermined delay period. The delay period commences when the line voltage is again within acceptable limits. Restore circuit 56 is connected to receive the indication of a fault condition from circuit 44 via path 58. An indication of a fault condition at any time resets the restore circuit 56 to restart the delay period.

Circuit Description

Figure 2:
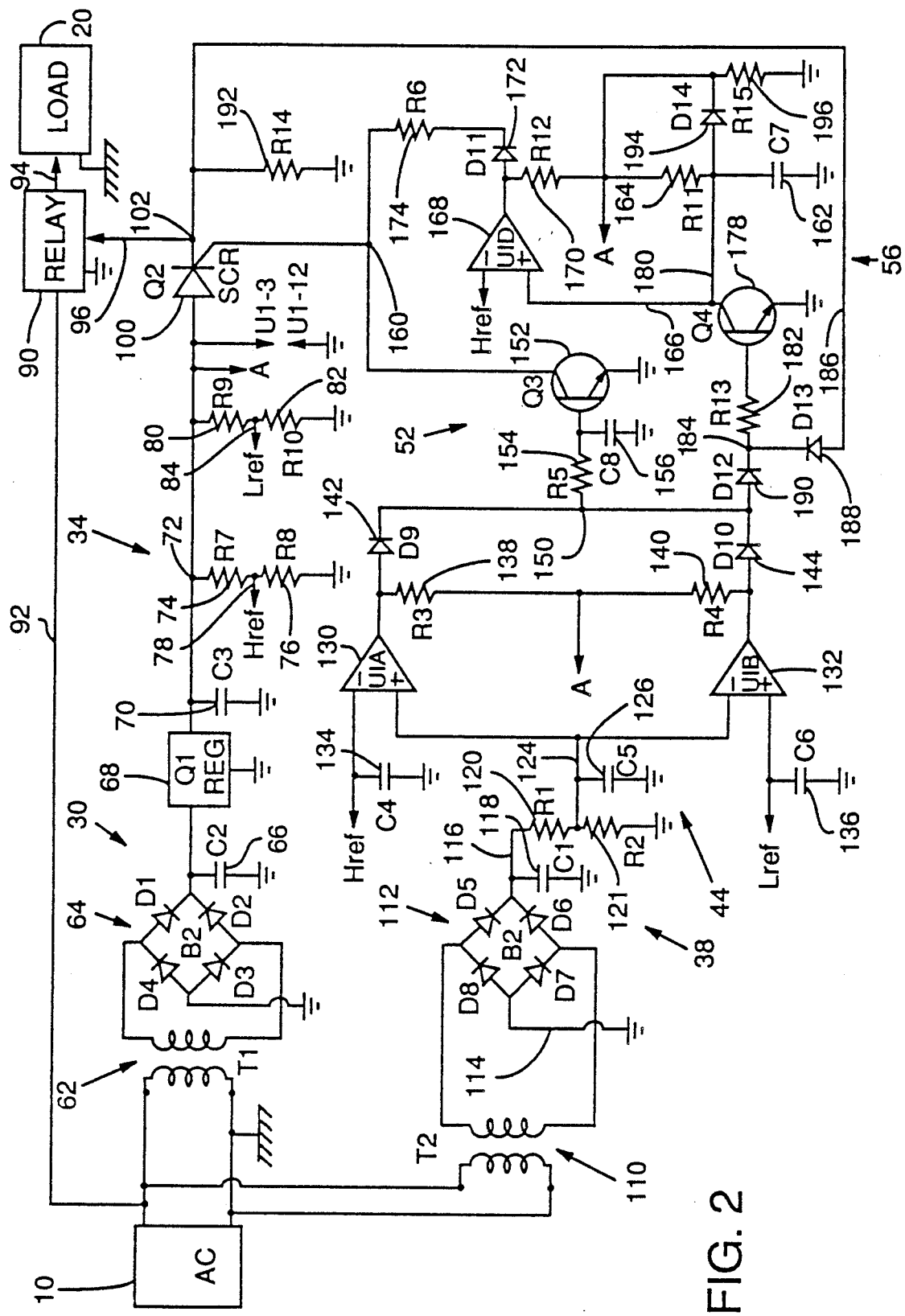
FIG. 2 is a schematic diagram of a circuit for implementing the control circuit of FIG. 1 in a single phase AC system.

FIG. 2 depicts an electronic circuit for implementing the functions outlined above. The secondary power supply 30 includes a transformer 62 having its primary terminals connected to the AC power line 10. The secondary terminals of transformer 62 are connected to the inputs of a full-wave bridge rectifier circuit 64. The output of bridge 64 is connected to a filter capacitor 66, and to an input terminal of a voltage regulator 68. A second filter capacitor 70 is connected to an output terminal of the voltage regulator 68. The transformer 62, bridge rectifier circuit 64, voltage regulator 68 and capacitors 66 and 70 provide a constant regulated DC voltage at node 72, also labeled "A".

The reference voltage circuitry 34 (FIG. 1) includes a first voltage divider consisting of resistors 74 and 76 connected in series between node 72 and ground. The values of resistors 74 and 76 are selected to provide a first reference voltage ($H_{ref}$) at node 78.

The reference voltage circuitry 34 also includes a second voltage divider, consisting of a first resistor 80 and a second resistor 82, connected in series between node 72 and ground. Resistors 80 and 82 are selected to provide a second reference voltage ($L_{ref}$) at node 84.

A relay 90 has an input terminal connected to receive the AC power along a path 92. The output terminal of relay 90 is connected to provide the AC power signal to AC powered user equipment 20 along path 94. A silicon controlled rectifier (SCR) 100 has an input terminal connected to node 72 to receive the regulated DC voltage and has an output terminal connected to node 102 for providing a control signal along path 96 to relay 90. Relay 90 is a DC-controlled AC relay, whereby when SCR 100 is ON, relay 90 is ON so that the AC power line is connected to the user equipment 20.

The AC power line voltage monitoring circuitry 38 (FIG. 1) is described next. The monitoring circuitry 38 preferably includes a second transformer 110 having its primary terminals connected to the AC power line 10 for receiving the AC power signal. The secondary terminals of transformer 110 are connected to input terminals of a second full-wave rectifier bridge circuit 112. A first output of the rectifier bridge circuit 112 is connected to ground via path 114. The other output of the rectifier bridge circuit 112 is provided to node 116. A filter capacitor 118 is connected between node 116 and ground. A resistive divider, consisting of series resistors 120 and 121, is connected between node 116 and ground to level shift the voltage presented at node 116. The monitoring voltage appears at node 124.

The AC power voltage monitoring circuitry 38 just described provides a variable DC monitoring voltage at node 124 proportional to the AC power voltage. The transformer 110, rectifier bridge circuit 112 and filtering network 118, 120, 121 are selected so that the monitoring signal at node 124 has a predetermined nominal DC voltage corresponding to the nominal AC power line voltage and so that variations in the power line voltage are reflected in corresponding variations in the monitoring signal voltage.

The monitoring circuitry components are selected so that the monitoring signal voltage is responsive to components of the power line voltage including those having frequencies greater than the nominal line frequency. Toward that end, a very small load is placed on the transformer 110 so that spikes are transmitted through the transformer without significant filtering. For example, a 300 mA transformer is used, although the actual steady-state load is less than 1 milliamp. Additionally, to avoid unduly filtering such higher frequency components of the power signal, moderate 120 Hz ripple at node 124, for example 10%, is permitted. This ripple does not compromise the accuracy of the control circuit voltages, as it is taken into account in calculating the reference voltages.

The window comparator circuit 44 is next described. It includes a first voltage comparator 130 and a second voltage comparator 132. Voltage comparators 130, 132 preferably have relatively high input impedance, again so that the load on the AC power line voltage monitoring circuit 38 is extremely small. This feature helps to ensure that high frequency components of the AC power signal are transmitted through the monitoring circuitry to the voltage comparators. An inverting input to voltage comparator 130 is connected to a receive reference voltage $H_{ref}$ at node 78. The non-inverting input to voltage comparator 132 is connected to receive the $L_{ref}$ reference voltage at node 84. Bypass capacitors 134 and 136 are connected between nodes 78 and 84, respectively, and ground to prevent ringing within the window comparator circuitry.

The non-inverting input to comparator 130 and the inverting input to comparator 132 are connected to node 124 to receive the monitoring voltage signal. The output terminals of comparators 130, 132 are connected to node 72 through pull-up resistors 138, 140 respectively. The output terminals of the comparators 130, 132 are also connected in a logical OR configuration to node 150 through diodes 142 and 144, respectively. The comparators 130, 132 preferably are integrated circuits. The described configuration drives node 150 to a high voltage state whenever the monitoring voltage at node 124 exceeds the reference voltage $H_{ref}$ or falls below the reference voltage $L_{ref}$. The voltage at node 150 controls the turnoff circuitry 52.

The turn-off circuitry 52 includes a transistor amplifier 152. The input (base) terminal of amplifier 152 is connected to node 150 through a current limiting resistor 154. A bypass capacitor 156 is connected between the input terminal and ground to stabilize the circuit. The output terminal (collector) of amplifier 152 is connected to node 160 and its emitter is coupled to ground. The SCR 100 has a gate terminal, also connected to node 160. Amplifier 152 thus is arranged in an inverting amplifier configuration.

Accordingly, when the voltage at node 150 goes high, indicating a fault condition, amplifier 152 turns on, essentially shorting the gate of SCR 100 to ground, thereby turning off the SCR 100. When the voltage at node 150 goes low (when the monitoring voltage of node 124 is between $H_{ref}$ and $L_{ref}$), amplifier 152 turns off but SCR 100 does not immediately turn back on. Turn-on of the SCR is controlled instead by restore circuitry 55, as next described.

The restore circuitry 56 is best understood by directing attention first to a capacitor 162. Capacitor 162 is connected to node A, the DC power source, through a pull-up resistor 164. The other terminal of capacitor 162 is connected to ground. Accordingly, left undisturbed, capacitor 162 will charge up to the DC voltage present at node A, over a period of time directly proportional to the RC product of the values of capacitor 162 and resistor 164. This RC delay timer circuit preferably provides a predetermined delay period of approximately 20 seconds.

Capacitor 162 is connected via path 166 to a non-inverting input of voltage comparator 168. The inverting input of comparator 168 is connected to node 78 to receive the $H_{ref}$ reference voltage. Accordingly, the output of comparator 168 goes high when the voltage on capacitor 162 equals the $H_{ref}$ reference voltage. The output terminal of comparator 168 is connected to the DC node A through a pull-up resistor 170. The output terminal of comparator 168 also is connected to the SCR 100 gate at node 160 via a diode 172 and a current limit resistor 174, connected in series.

Accordingly, when the output terminal of comparator 168 goes high, the voltage at node 160 is pulled up, thereby turning SCR 100 on, provided that amplifier 152 is off. When amplifier 152 is on, node 160 is pulled down to a low voltage, or logical OFF state, regardless of the state of the output terminal of amplifier 168. Therefore, an indication of a fault condition from the window comparator circuitry 44 will turn SCR 100 off and consequently, deactuate relay 90, without regard to the status of the delay timer 162, 164. Conversely, the SCR cannot turn back on until both the fault condition has abated and the capacitor 162 of the delay circuitry has recharged.

The delay timer circuitry 162, 164 is reset as follows. An NPN transistor 178 has a collector terminal connected to node 180 and an emitter terminal connected to ground. Therefore, so long as transistor 178 is on, capacitor 162 is shunted to ground, or nearly so, and held in a nearly discharged state.

The base terminal of transistor 178 is connected through current limit resistor 182 to a node 184. Node 184 is connected to node 150 (through a diode 190) so that an indication of a fault condition turns transistor 178 on Node 184 also is connected to node 102 (the output of SCR 100) through a diode 188 and via path 186 so that transistor 178 is maintained in an ON state so long as the SCR 100 is on, because base drive current to the transistor 178 is provided by the DC power source through the SCR 100. Diode 190 decouples node 102 from node 150 so that firing of SCR 100 does not actuate the turn-off circuitry 52. A load resistor 192 is connected between node 102 and ground to maintain SCR 100 in an ON state and to pull down the voltage at node 102 to avoid inadvertent turn-on of transistor 178 when SCR 100 is off. Signals present at nodes 150 and 102 thus are logically ORed together at node 184 so as to turn on transistor 178 so long as a fault condition is indicated or SCR 100 is on. SCR 100 remains on, and therefore capacitor 162 remains discharged, in the normal steady-state.

Capacitor 162 (node 180) is also connected to ground through a diode 194 and a series resistor 196. The cathode of diode 194 and resistor 196 are connected to node A. Circuit operation after a total power failure is as follows. When the voltage at node A is relatively low, diode 194 can be forward biased by voltage on capacitor 162. This allows the capacitor 162 to discharge through resistor 196. When the voltage at node A rises to normal operating level, diode 194 is reverse biased, thereby decoupling capacitor 162 from the discharge resistor 196. Therefore, upon initial power-up and after a complete power failure, the delay period determined by RC network 164, 162 must time out before the AC power line is connected to the user equipment. This ensures that the monitoring and control circuitry has stabilized in a normal operating state and that any initial transients on the AC power line have subsided.

In the event of a second power failure during the restart sequence, diode 194 ensures that capacitor 162 discharges so as to restart the delay period. A complete, uninterrupted delay period thus is required before the user equipment is connected to the AC line.

In an example of an operative embodiment of the present invention, the circuit components shown in FIG. 2 are specified as shown in the following Table I. These component values are selected to provide an AC operating voltage window of 120 VAC plus or minus approximately 9% (i.e., 109–131 volts).

TABLE I

| Part Designation | Value |
|---|---|
| Resistors | |
| R1 | 16k Ohms |
| R2 | 1.87k Ohms |
| R3 | 1k Ohms |
| R4 | 1k Ohms |
| R5 | 10k Ohms |
| R6 | 27k Ohms |
| R7 | 10k Ohms |
| R8 | 10k Ohms |
| R9 | 11.8k Ohms |
| R10 | 8.25k Ohms |
| R11 | 220k Ohms |
| R12 | 1k Ohms |
| R13 | 10k Ohms |
| R14 | 1k Ohms |
| R15 | 1k Ohms |
| Capacitors | |
| C1 | 100 Microfarads |
| C2 | 220 Microfarads |
| C3 | 220 Microfarads |
| C4 | .01 Microfarads |
| C6 | .01 Microfarads |
| C7 | 100 Microfarads |
| Semiconductors and Integrated Circuits | |
| Q1 Voltage regulator | 7805 (5.0 volts) |
| Q2 SCR | Teccor Sensitive Gate |
| SCR | |
| | Model EC103B |
| Q3, Q4 | 2N2222 |

TABLE I-continued

| Part Designation | Value |
| --- | --- |
| U1A-U1D Voltage Comparators | LM339 |
| Relay | Crydom Model CTD 2425 |
| D1-D8 Diodes | 1N4004 |
| D9-D14 Diodes | 1N914 |
| Transformers | |
| T1, T2 | 120:12.6 VAC 300 mA |

Note:
(1) All resistors are ¼ watt.
(2) R1,R2,R7,R8,R9 and R10 are +/− 1%; others 5%
(3) .01 Microfarad capacitors are 12 vdc.
(4) Other capacitors are 35 vdc.

OPERATION

A. Power-Up

When power is applied to the control circuitry, SCR 100 is off and resistor 192 ensures that a low voltage is present at node 102. The comparators 130, 132 are on, so that a low voltage is presented at node 150 and, through diode 190, to node 184. Accordingly, transistor 178 is off, thereby allowing capacitor 162 to begin charging through resistor 164.

At the conclusion of the predetermined delay period, the output of amplifier 168 goes high, as described above, firing the SCR 100 to an ON state. SCR 100 provides a control voltage over path 96 to the relay 90, thereby actuating relay 90 to connect AC power to the user equipment 20. SCR 100 in its ON state also turns on transistor Q4 through diode 188, thereby discharging delay capacitor 162 so that the delay timer is enabled for the next fault condition.

B. Normal Steady-State Operation

In the normal steady-state operation, the secondary power circuitry 30 provides a regulated DC voltage, for example, 5 volts, at node 72, also labeled "A". The voltage dividers described above provide a first reference voltage $L_{ref}$, for example, 2.06 volts DC and the second reference voltage $H_{ref}$, for example, 2.5 volts DC. The AC power signal voltage monitoring circuitry 38 converts the AC power signal to a representative monitoring signal which is input to the window comparator circuitry 44 at node 124. For a nominal line voltage of 120 volts RMS, the monitoring voltage at node 124 will be, for example, 2.3 volts DC, with 120 Hz ripple of approximately 10%. Because this value is within the reference voltage window defined by $L_{ref}$ and $H_{ref}$, the output of comparators 130, 132 are low so that the voltage at node 150 is low, maintaining the shut-off circuitry 52 in an OFF state.

Transistor 178 is maintained in an ON state by base drive current provided through the SCR 100. Accordingly, as described above, capacitor 162 is essentially shorted, maintaining the RC timer circuit in a reset state. Variations in the AC power signal voltage are ignored so long as the voltage does not exceed the power signal operating voltage window defined by the reference voltages.

Most AC powered user equipment is designed to operate with a nominal 120 volt supply, within a tolerance of 10%. To ensure compliance with that requirement, the present control circuitry is preferably arranged to disconnect the user equipment from the AC power line whenever the power signal voltage departs from the nominal value by approximately 9%. The corresponding AC power signal voltage is 109 to 131 volts rms, or 154 to 185 volts peak.

C. Over-voltage Fault Condition.

Whenever the AC line voltage exceeds a predetermined high limit voltage, preferably approximately 185 volts peak, a monitoring voltage greater than $H_{ref}$ is presented at node 124. This causes comparator 130 to switch its output off, i.e. to a high voltage at node 150, indicating a fault condition. This voltage actuates the turn-off circuitry 52 as previously described.

The turn-off circuitry essentially grounds the gate of SCR 100, thereby turning the SCR 100 off. When the SCR 100 is off, a low voltage appears at node 102, thereby deactuating relay 90 so as to disconnect the user equipment 20 from the AC power line 10. The foregoing turn-off sequence takes approximately a few microseconds. The effective AC turn-off time is essentially determined by the turn-off time of relay 90, as the other control circuitry is relatively fast. In the worst case, where relay 90 switches off only at zero crossings, the delay is approximately 8.3 milliseconds or one-half cycle.

Shut-off of SCR 100 discontinues base drive through diode 188 to transistor 178. This will allow capacitor 162 to begin charging provided that the fault condition is eliminated. As long as a fault condition persists, an indication of a fault condition in the form of a high voltage is presented at node 150, and transistor 178 is maintained in the ON state by the base drive current provided through diode 190.

D. Restore Operation

As noted, when SCR 100 is off and a fault condition is not indicated, the RC timer circuit 162, 164 begins the delay period. At the conclusion of the delay period, the output of comparator 168 goes high, turning on SCR 100, provided that the turn-off circuitry 52 is not actuated by an indication of a fault condition. A new indication of a fault condition at any time actuates the turn-off circuitry 52, keeping the SCR 100 off and drives transistor 178, on thereby resetting the delay timer.

E. Under-Voltage (Brown-Out) Fault Condition

In the event of an undervoltage condition, comparator 132 turns off, thereby presenting a high voltage at node 150. This indication of a fault condition actuates the turn-off circuitry 52 and maintains the reset timer as described above with respect to the over-voltage condition. The user equipment is reconnected to the AC power line after the under-voltage fault condition is eliminated and after the delay period is completed, in the same manner as described above.

Figure 3:
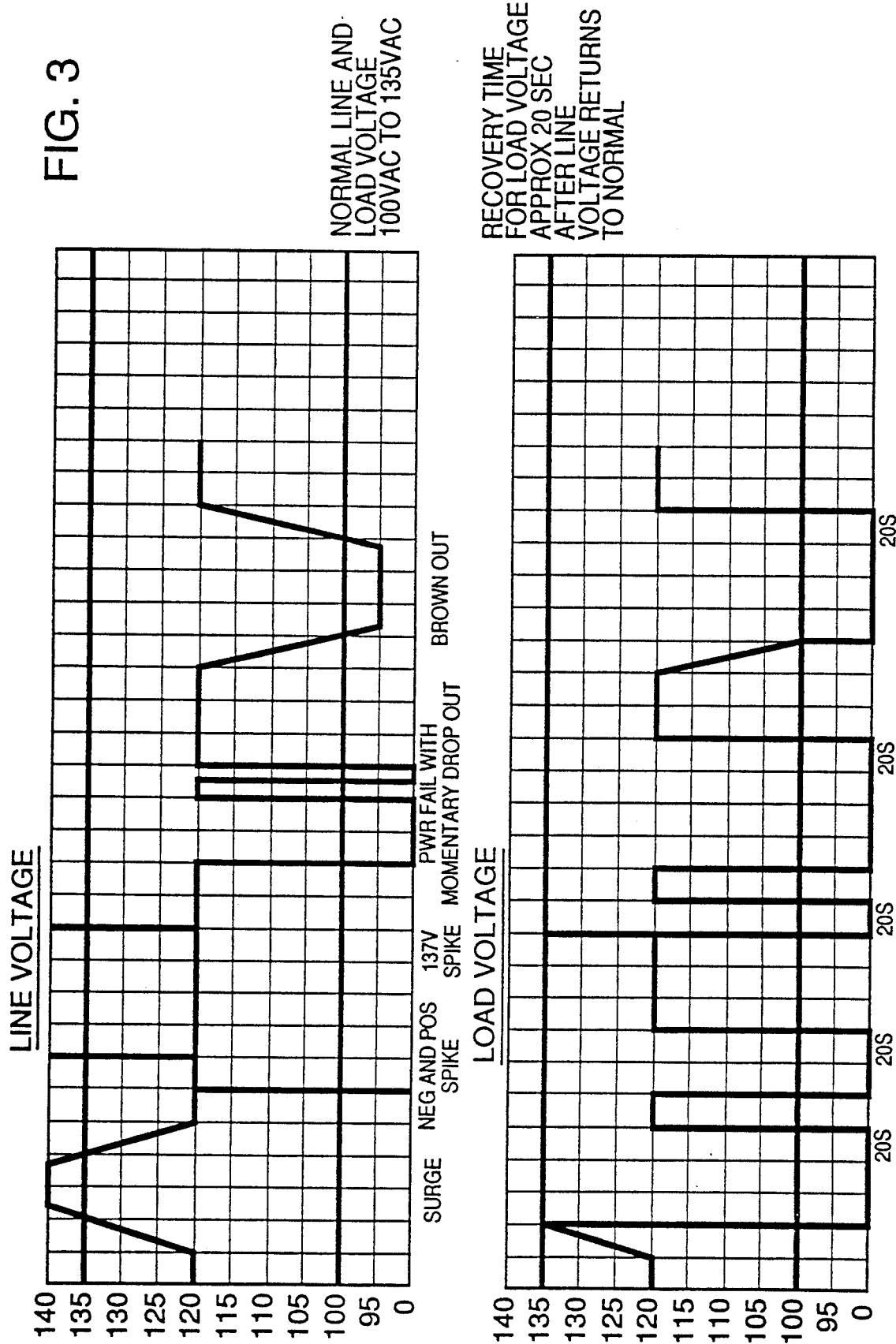
FIG. 3 is a timing diagram illustrating operation of the circuit of FIG. 2 in response to various power line transients, overvoltage and undervoltage conditions.

FIG. 3 illustrates the foregoing operation of the control circuit. The upper portion of FIG. 3 is a graph of a hypothetical AC power line voltage (rms) versus time. The line voltage includes various surges, spikes and brown-out conditions. The lower portion of FIG. 3 is a graph of the load voltage, i.e., the voltage at the user equipment 20. The horizontal axes of the upper and lower portions of FIG. 3 are registered to illustrate the correspondence between the line voltage and the load voltage. The AC operating voltage window is set at 109–131 volts. Each time the line voltage escapes that window, the load is disconnected so that the load voltage drops to zero. The user equipment is reconnected only after the line voltage has remained continuously within the operating voltage window for the delay period, here illustrated as 20 seconds.

Figure 4:
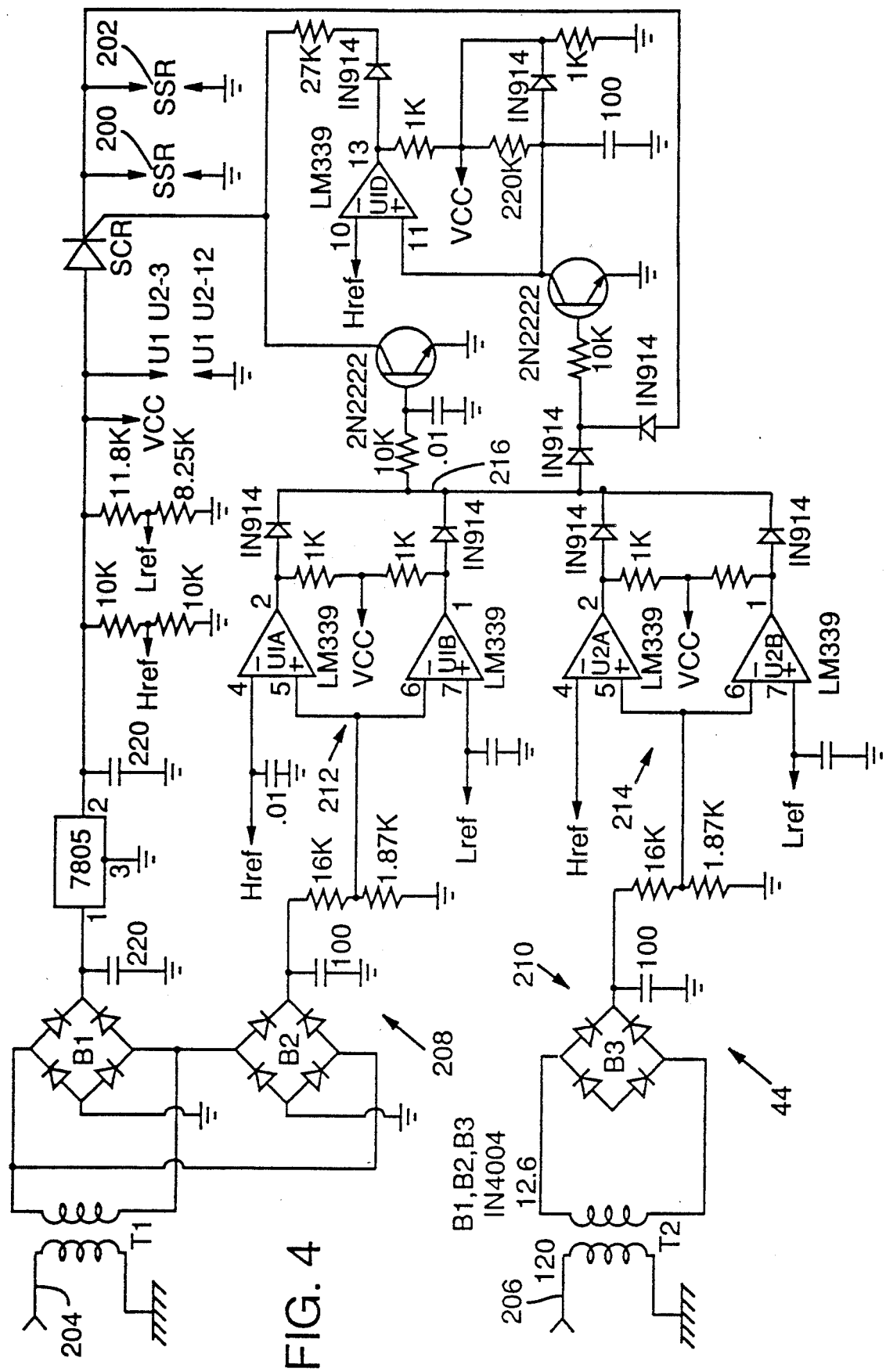
FIG. 4 is a schematic diagram of a control circuit according to the present invention for protecting the user equipment connected to a nominally 240 VAC singlephase power line.

FIG. 4 is a schematic diagram of an example of a protection and control circuit arranged to control the power signal connections between a 240 volt, single phase powerline and AC-powered user equipment. A DC-controlled, AC output solid-state power relay (SSR) 200, 202 is connected between each "hot" AC powerline and the user equipment. The control inputs to the relays are connected to the circuit at SSR connections 200 and 202 in the upper right portion of FIG. 4.

The "hot" powerlines are connected at junctions 204 and 206 for providing the AC power signals to the circuit. The circuit includes two AC power signal voltage monitoring circuits 208 and 210. Each monitoring circuit is similar to the monitoring circuit 38 of FIG. 1 and operates as described above. The 240 volt circuit also includes two window comparator circuits 212 and 214. Each comparator circuit is similar to the window comparator circuit 44 of FIG. 1 and also operates as described above.

The outputs of both comparator circuits 212, 214 are coupled to turn-off and restore circuits in a logical OR configuration at junction 216, so that an indication of a fault condition on either side of the powerline actuates the circuit to disconnect the user equipment from the powerline. The user equipment is reconnected after a delay period in the same manner as described above with reference to the 120 volt circuit.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. An automatic control circuit for controlling a power signal connection between an AC power line and AC-powered user equipment, the circuit comprising:
    a first switch means for switching the power signal connection between the power line and the user equipment;
    AC input means connectable to the power line for coupling the AC power line to the circuit;
    AC voltage monitoring means connected to the AC input means for detecting and indicating a fault condition whenever the power line voltage is outside a predetermined AC operating voltage window;
    turn-off means coupled to the monitoring means for actuating the first switch means to disconnect the user equipment from the power line responsive to the indication of a fault condition; and
    restore means for actuating the first switch means to connect the user equipment to the power line upon completion of a predetermined delay period commencing when a fault condition is no longer indicated;
    the restore means being coupled to the monitoring means so that an indication of a second fault condition during the delay period restarts the delay period.

2. A circuit according to claim 1 wherein the first switch means is controllable by a DC signal and further comprising:
    a DC power source for providing the DC signal; and
    a second switch means connected between the DC power source and the first switch means for controlling the first switch means, whereby actuating the second switch means actuates the first switch means to connect the user equipment to the power line and deactuating the second switch means deactuates the first switch means to disconnect the user equipment from the power line.

3. A circuit according to claim 2, wherein the second switch means includes:
    an input terminal coupled to the DC power source, an output terminal coupled to the first switch means, and a gate for controlling the second switch means;
    the gate being coupled to the window comparator means so as to deactuate the second switch means responsive to the indication of a fault condition to disconnect the first switch means from the DC power source.

4. A circuit according to claim 2, wherein the second switch means includes:
    an input terminal coupled to the DC power source, an output terminal coupled to the first switch means, and a gate for controlling the second switch means;
    the gate being coupled to the restore means so as to actuate the second switch means to connect the DC power source to the first switch means at the conclusion of the delay period.

5. A circuit according to claim 2 wherein the restore means includes:
    a reset and hold input means coupled to the comparator means and to the second switch means for resetting the restore means and for holding the restore means in a reset state so long as at least one of a fault condition is indicated and the second switch means is actuated; and
    the restore means is arranged to commence the delay period when the AC power signal is present at the AC input means and the restore means is not held in the reset state, whereby upon initial power-up of the AC power signal and after a fault condition is removed, connection of the power line to the user equipment is delayed by the delay period.

6. A circuit according to claim 1 wherein:
    the restore means includes resettable timer means for providing the predetermined delay period;
    the timer means is coupled to the aC voltage monitoring means so as to reset the timer means and hold the timer means in a reset state so long as a fault condition is indicated, whereby the delay period does not begin so long as the power signal voltage is outside the AC operating voltage window; and
    the timer means is coupled to the first switch means so as to reset the timer means and hold the timer means in a reset state so long as the first switch means is actuated whereby the delay period cannot begin so long as the power signal is connected to the user equipment.

7. An automatic control circuit for controlling a power signal connection between an AC power line and AC-powered user equipment, the circuit comprising:
    a first switch means for switching the power signal connection between the power line and the user equipment;
    AC input means connectable to the power line for coupling the power signal to the circuit;

AC voltage monitoring means coupled to the AC input means for providing a monitoring signal having a DC voltage that varies responsive to the power line voltage including components of the power signal having frequencies greater than the nominal line frequency;

window comparator means connected to the AC voltage monitoring means for detecting and indicating a fault condition whenever the DC monitoring signal voltage is outside a predetermined DC reference voltage window that corresponds to a predetermined AC operating voltage window; and protection means coupled to the window comparator means and coupled to the first switch means for disconnecting the user equipment from the AC power line responsive to the indication of a fault condition to protect the user equipment from power line voltages outside the AC operating voltage window;

the protection means including means for reconnecting the user equipment to the AC power line only after the power line voltage has remained within the AC operating voltage window for a predetermined delay period.

8. A method of controlling a power signal connection between an AC power line and AC-powered user equipment, the method comprising the steps of:

monitoring the power line voltage;

indicating a fault condition whenever the power line voltage is outside a predetermined AC operating voltage range;

disconnecting the user equipment from the AC power line responsive to the indication of a fault condition;

commencing a predetermined delay period when a fault condition is no longer indicated; and reconnecting the user equipment to the AC power line upon completion of the delay period.

9. A method according to claim 8 including recommencing the delay period responsive to a second indication of a fault condition during the delay period so that the reconnecting step occurs only after the power signal voltage remains within the AC operating voltage range continuously for a period of time not less than the delay period.

10. An automatic control circuit for controlling a power signal connection between an AC power line and AC-powered user equipment, the circuit comprising:

a controllable power line switch means for switching the power signal connection between the power line and the user equipment;

AC input means connectable to the power line for coupling the power signal to the circuit;

AC voltage monitoring means coupled to the AC input means for providing a monitoring signal having a DC voltage that varies responsive to the power line voltage including components of the power signal having frequencies greater than the nominal line frequency;

window comparator means connected to the AC voltage monitoring means for detecting and indicating a fault condition whenever the DC monitoring signal voltage is outside a predetermined DC reference voltage window that corresponds to a predetermined AC operating voltage window;

turn-off means coupled to the window comparator means for deactuating the power line switch means responsive to the indication of a fault condition to disconnect the user equipment from the AC power line;

a delay capacitor connected between a first junction and a ground junction;

a pull-up resistor connected between the first junction and a DC voltage source for charging the delay capacitor to provide a delay period defined by a time required to charge the delay capacitor from a substantially discharged voltage to a predetermined reference voltage;

a transistor having a base terminal coupled to the window comparator means and coupled to the power line switch means so that the transistor is ON when either or both of a fault condition is indicated and the power line switch means is actuated;

the transistor further having an output terminal coupled to the first junction so as to discharged the delay capacitor and maintain the delay capacitor discharged so long as the transistor is ON, thereby preventing commencement of the delay period for so long as the transistors is ON; and a voltage comparator having a first input terminal coupled to receive the reference voltage, a second input terminal coupled to the first junction and an output terminal coupled to actuate the power line switch means when the second input terminal voltage exceeds the first input terminal voltage, thereby reconnecting the user equipment to the AC power line at a conclusion of the delay period.

11. A circuit according to claim 10 wherein:

the delay reference signal voltage, the delay capacitor and the pull-up resistor are selected such that the delay period is in the range of approximately 1 to 100 seconds.

12. A circuit according to claim 10 including:

a second pull-up resistor connected between the DC voltage source and the ground junction; and a diode having an anode terminal connected to the first junction and a cathode junction connected to the DC voltage source for discharging the delay capacitor through the second pull-up resistor when the DC voltage source voltage is below the delay capacitor voltage so that the timer is reset whenever the DC voltage source is removed to provide a delay period after application of power to the control circuit before it connects the user equipment to the power line.

13. An automatic control circuit for controlling a power signal connection between an AC power line and AC-powered user equipment, the circuit comprising:

a first switch means for switching the power signal connection between the power line and the user equipment;

AC input means connectable to the power line for coupling the power signal to the circuit;

AC voltage monitoring means coupled to the AC input means for providing a monitoring signal having a DC voltage that varies responsive to the power line voltage including components of the power signal having frequencies greater than the nominal line frequency;

window comparator means connected to the AC voltage monitoring means for detecting and indicating a fault condition whenever the monitoring signal voltage is outside a predetermined DC reference voltage window that corresponds to a predetermined AC operating voltage window;

turn-off means coupled to the window comparator means for deactuating the first switch means responsive to the indication of a fault condition to disconnect the user equipment from the AC power line; and restore means for actuating the first switch means upon a conclusion of a predetermined delay period to reconnect the user equipment to the AC power line, the restore means being coupled to the window comparator means and to the first switch means so as to commence the delay period when the first switch means is deactuated and a fault condition is not indicated, and including a timer comprising:

a delay capacitor;

a pull-up resistor connected between the delay capacitor and a AC voltage source for charging the capacitor;

voltage comparator means coupled to the delay capacitor and coupled to receive a DC reference voltage for indicating the conclusion of the delay period when the delay capacitor voltage exceeds the DC reference voltage; and a second switch means, connected between the delay capacitor and a ground junction and having a control input coupled to the window comparator means, for discharging the delay capacitor responsive to the indication of a fault condition and for holding the delay capacitor discharged so long as a fault condition is indicated; whereby, in operation, a new indication of a fault condition during the delay period discharges the delay capacitor to restart the delay period.

14. A circuit according to claim 13 wherein the second switch means comprises a transistor.

* * * * *